(12) United States Patent
Green et al.

(10) Patent No.: US 6,575,858 B2
(45) Date of Patent: Jun. 10, 2003

(54) COMPENSATING DRIVE BELT TENSIONER

(75) Inventors: Michael H. Green, Rochester, NY (US); James G. Amorese, Webster, NY (US)

(73) Assignee: Heidelberger Druckmaschinen AG, Heidelberg (DE)

(*) Notice: Subject to any disclaimer, the term of this patent is extended or adjusted under 35 U.S.C. 154(b) by 6 days.

(21) Appl. No.: 09/809,760

(22) Filed: Mar. 15, 2001

(65) Prior Publication Data

US 2001/0046915 A1 Nov. 29, 2001

Related U.S. Application Data

(60) Provisional application No. 60/190,474, filed on Mar. 17, 2000.

(51) Int. Cl.[7] .................................................. F16H 7/12
(52) U.S. Cl. ........................................ 474/133; 474/138
(58) Field of Search ............................... 474/117, 121, 474/133, 124, 138, 136, 101

(56) References Cited

U.S. PATENT DOCUMENTS

| | | | | |
|---|---|---|---|---|
| 4,500,303 A | * | 2/1985 | Sermersheim et al. | 424/117 |
| 5,214,448 A | * | 5/1993 | Venthem | 310/91 |
| 5,240,461 A | * | 8/1993 | Hohnl | 474/101 |
| 5,518,459 A | * | 5/1996 | Sakai et al. | 474/133 |
| 5,928,097 A | * | 7/1999 | Mast | 474/133 |
| 6,120,401 A | * | 9/2000 | Wilken | 474/109 |
| 6,406,391 B1 | * | 6/2002 | Ullein | 111/133 |
| 2001/0046913 A1 | * | 11/2001 | Rapkin et al. | 474/117 |

* cited by examiner

Primary Examiner—Christopher P. Schwartz
Assistant Examiner—Devon Kramer
(74) Attorney, Agent, or Firm—Kathleen K. Bowen

(57) ABSTRACT

A drive belt tensioning method and assembly using a spring loaded, non-active tensioner. The spring is mounted between a base plate, and a tensioner arm, both of which rotate. A belt tensioning pulley is mounted on the tensioner arm, such that the belt tensioning pulley is adjacent to the drive belt. The tension of the spring causes the tensioner arm to rotate which causes the belt tensioning pulley to tension the drive belt. The spring chosen has a predetermined working length at which the drive belt has the desired tension. Because both the base plate and the tensioner arm rotate, the spring may be kept at this predetermined working length for each belt adjustment. This enables the drive belt to maintain the desired tension. An alignment index integral to the assembly may be used to ensure that the spring is at the predetermined working length.

20 Claims, 6 Drawing Sheets

COMPENSATING DRIVE BELT TENSIONER

This application claims the benefit of U.S. Provisional Application No. 60/190,474, filed Mar. 17, 2000.

BACKGROUND

The present invention is in the field of drive belt tensioning. In particular this invention is directed towards a compensating belt tensioner which is very useful for adjusting the tension on drive belts, especially timing belts.

During normal use drive belts commonly become slack due to belt stretching, machine vibration and/or heat. To keep the machine operating properly, these belts are subjected to regular belt tension adjustments.

In the present state of the art, drive belts are normally tensioned by one of three methods. One method is to move the drive motor or one of the drive points to take up belt slack. This however is not always practical, and some sort of tension gage should be used to verify the tension. Another method is a spring-loaded tensioner, which is loosened to take up belt slack, and then tightened down. Unfortunately, because the spring length changes (An extension spring would become shorter, a compression spring would become longer, and a torsion spring would become more angularilly relaxed.), with each adjustment, its tension force decreases, and therefore each adjustment leaves the drive belt with slightly less tension than the time before. A third method is to have an active, "live", tensioner which is also spring loaded, (usually powered by a torsion spring) but the spring is not tightened down, and is therefore free to continuously take up the slack in the drive belt. This method is not recommended for timing belts, as the tensioner can recoil under transient loads, allowing belt tooth cogging, and resultant machine malfunction.

A drive belt tensioner method and assembly are desired which is not active, which can adjust the tension of the drive belt simply, and efficiently, and which will apply a consistent, predictable belt tensioning setting, regardless of belt age or machine configuration tolerances.

SUMMARY OF THE INVENTION

A compensating tensioner assembly, and a method for tensioning drive belts on machines wherein a base plate is mounted to the machine at a base plate mounting point such that the base plate can be rotated about the base plate mounting point when the base plate is not secured against rotation. A tensioner arm is then mounted to the base plate at a tensioner arm mounting point such that the tensioner arm can be rotated about the tensioner arm mounting point when the tensioner arm is not secured against rotation and wherein a belt tensioning pulley is mounted to the tensioner arm such that it is adjacent to the drive belt.

A spring with an end one and an end two, is attached at end one to the base plate, and at end two to the tensioner arm, such that when the tensioner arm is not secured against rotation the spring causes the tensioner arm to pivot about the tensioner arm mounting point, which in turn causes the belt tensioning pulley to exert a force on the drive belt in a manner which increases the tension on the drive belt, the spring having a predetermined working length, at which the spring causes a predetermined tension to be applied on the drive belt.

The base plate is then rotated about the base plate mounting point, and the tensioner arm about the tensioner arm mounting point until the spring attains the predetermined working length. Both the base plate and the tensioner arm are then secured against rotation.

DETAILED DESCRIPTION

Figure 1:
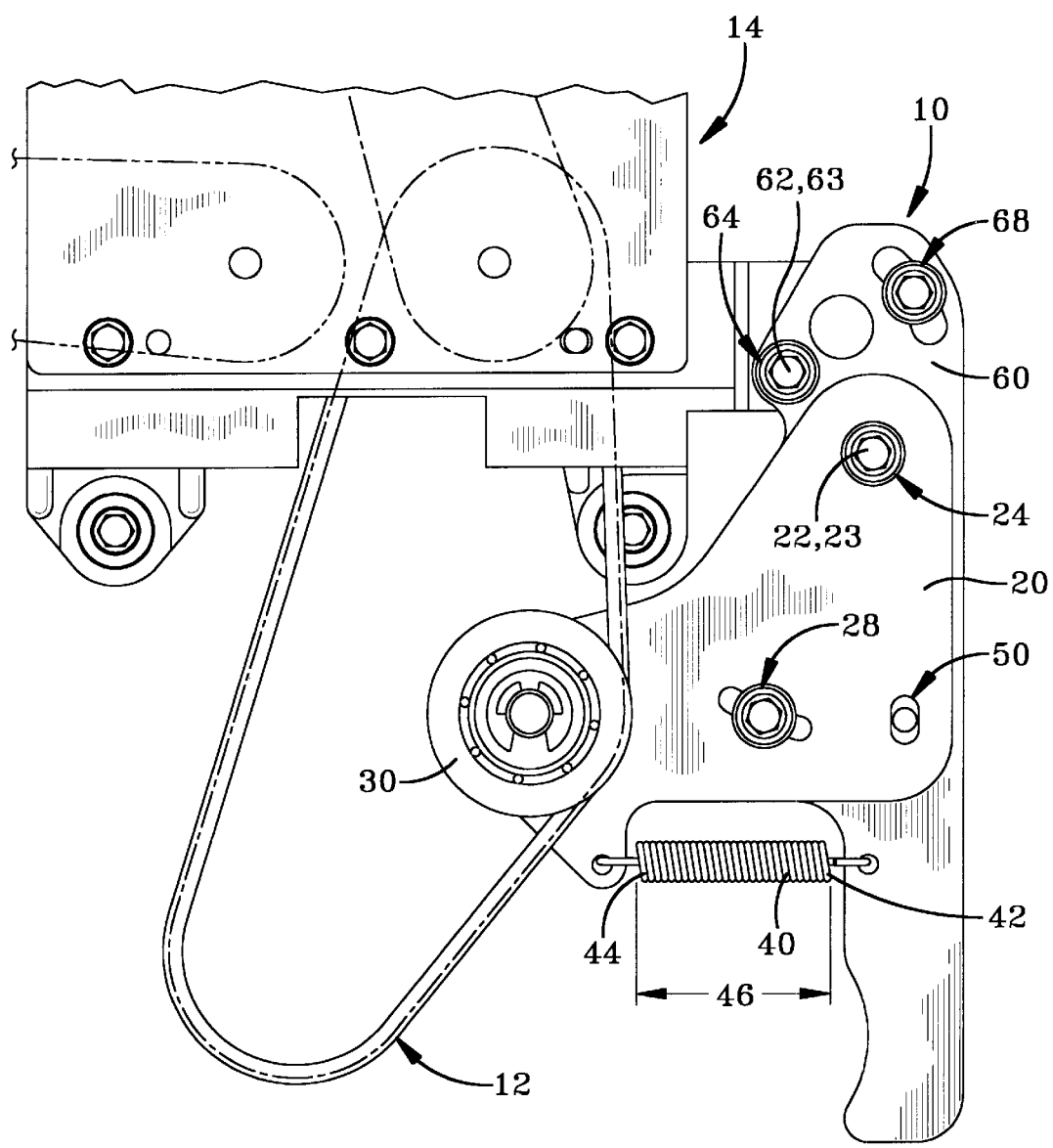
FIG. 1 is a front view of a compensating tensioner assembly according to an aspect of the invention.

Various aspects of the invention are presented in FIGS. 1–7 which are not drawn to scale and in which like components are numbered alike. Referring now to FIG. 1, according to an aspect of the invention, a compensating tensioner assembly for tensioning a drive belt 12 on a machine 14 is shown. This assembly comprises a base plate 60, a tensioner arm 20, a belt tensioning pulley 30, a spring 40 and an alignment index 50. As will be described more fully within, the tensioner arm 20 and belt tensioning pulley 30 apply a predetermined force transverse to the drive belt 12 that induces a predetermined tension in the drive belt 12.

Still referring to FIG. 1, a base plate 60 is mounted on the machine 14 at a base plate pivot point 62, such that the base plate 60 is free to pivot about the base plate pivot point 62 when the base plate 60 is not secured against rotation. A tensioner arm 20 is mounted to the base plate 60 at a tensioner arm pivot point 22 such that the tensioner arm 20 can be rotated about the tensioner arm pivot point 22 when the tensioner arm 20 is not secured against rotation. A belt tensioning pulley 30 is mounted to the tensioner arm 20 such that it is adjacent to the drive belt 12.

Also shown in FIG. 1, a spring 40 with an end one 42 and an end two 44, wherein end one 42 is attached to the base plate 60, and end two 44 is attached to the tensioner arm 20, such that when the tensioner arm 20 is not secured against rotation the spring 40 causes the tensioner arm 20 to pivot about the tensioner arm pivot point 22, which in turn causes the belt tensioning pulley 30 to exert a force on the drive belt 12 in a manner which increases the tension on the drive belt 12. The spring 40 has a predetermined working length 46 that develops a predetermined force transverse to the drive belt 12 which in turn induces a predetermined tension in the drive belt 12.

An alignment index 50 according to one aspect of the invention is also shown in FIG. 1, this is used to align the tensioner arm 20 and the base plate 60 with respect to each other such that the predetermined spring working length 46 can be maintained at each drive belt 12 tension adjustment.

Figure 3:
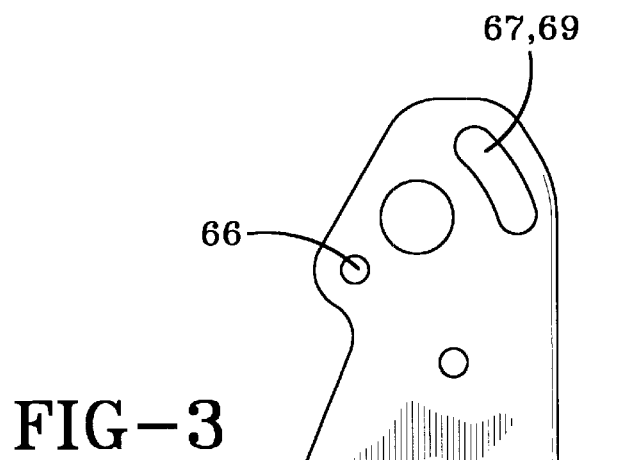
FIG. 3 is a front view of a base plate according to an aspect of the invention.
Figure 2:
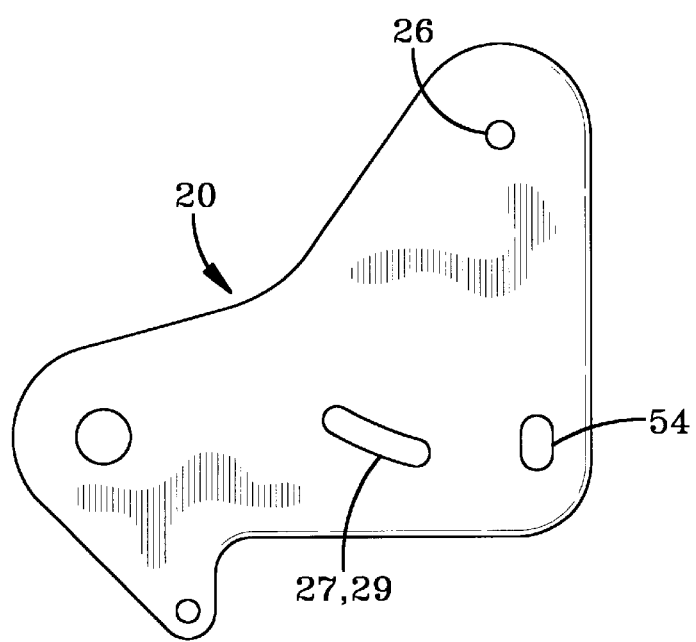
FIG. 2 is a front view of a tensioner arm according to an aspect of the invention.

Referring now to FIGS. 2 and 3, the alignment index for this particular embodiment of the invention comprises an alignment hole 52 in the base plate 60, and an alignment slot 54 in the tensioner arm 20, wherein when the spring 40 is at the predetermined working length 46, the alignment hole 52 will be fully visible within the alignment slot 54. Although the alignment hole 52 and alignment slot 54 could be any size which is reasonably visible, it is preferred that they be large enough to be seen from a perspective, as they are not always visible head on during normal use. In a preferred embodiment the alignment hole 52 is approximately 0.18 inches in diameter, and the alignment slot 54 is approximately 0.22 inches wide. Although this is the only alignment index configuration shown, the alignment index is in no way limited to this configuration.

The alignment index could comprises a notch in the tensioner arm 20 and a scribe line in the base plate 60, such that when the spring 40 is at the predetermined working length 46, the notch and the scribe line will line up. There could also be a series of scribe lines in the base plate 60 which correspond to different spring/belt tensions. There are many possible ways in which an alignment index could be made integral to the assembly.

There are other ways in which an alignment index is useful. For instance, after a machine 14 is manufactured, but before it is sent out, there is often a burn-in of the machine 14. This is a continuous running of the machine for a period of time wherein the belts are over tensioned. In this case the alignment hole 52 and alignment slot 54 can be used as an over-tension index, such as when the alignment hole 52 is only half visible through the alignment slot 54. There could also be two sets of alignment holes 52 and alignment slots 54, one for regular operation, and one for burn-in. Likewise if a notch and scribe line are used, there could be two scribe lines on the base plate 60, one for normal operation, and one for burn-in.

Referring to FIGS. 1, 2 and 3, according to an aspect of the invention, the base plate 60 is mounted to the machine 14 at the base plate pivot point 62 using a base plate pivot screw 64, wherein the base plate 60 has a base plate pivot hole 66 at the base plate pivot point 62 in which the base plate pivot screw 64 fits.

Base plate 60 mounting may also be accomplished in a number of other ways, including but not limited to using a pin, a rivet or a bolt in place of the base plate pivot screw 64. Although other methods would work, it is preferable to use a screw, because a screw increases rigidity of the assembly, which in turn decreases the belt wander. This is especially important for digital electro photographic marking engines, to maintain image quality. This is true for all the following references to screws of any kind, although other methods would work, the method of preference is a screw.

In a further embodiment of the invention, the base plate 60 is mounted at a second point by a base plate slot screw 68 wherein the base plate 60 also has a hole one 69 which is configured to allow movement, in which the base plate slot screw 68 fits, such that when the base plate pivot screw 64 and the base plate slot screw 68 are in their holes, but are not secured, the base plate 60 is free to pivot about the base plate pivot screw 64, to the extent allowed by hole one 69.

In another embodiment of the invention, the hole for the base plate slot screw 68 is actually a slot one 67, in which the base plate slot screw 68 fits, such that when the base plate pivot screw 64 and the base plate slot screw 68 are in their holes, but are not secured, the base plate 60 is free to pivot about the base plate pivot screw 64, to the extent allowed by the slot one 67. Other methods may be used for the second mounting point, including but not limited to a spring loaded detent, with corresponding holes.

Still referring to FIGS. 1–3, according to another aspect of the invention, the tensioner arm 20 is mounted to the base plate 60 at the tensioner arm pivot point 22 using a tensioner arm pivot screw 24, wherein the tensioner arm 20 has a tensioner arm pivot hole 26 at the tensioner arm pivot point 22 in which the tensioner arm pivot screw 24 fits.

In a further embodiment, the tensioner arm 20 is mounted to the base plate 60 at a second point by a tensioner arm slot screw 28, wherein the tensioner arm 20 has a hole two 29 which is configured to allow movement, in which the tensioner arm slot screw 28 fits, such that when the tensioner arm pivot screw 24 and the tensioner arm slot screw 28 are in their holes, but are not secured, the tensioner arm 20 is free to pivot about the tensioner arm pivot screw 24, to the extent allowed by hole two 29.

In another embodiment of the invention, the hole two 29 is actually a slot two 27, in which the tensioner arm slot screw 28 fits, such that when the tensioner arm pivot screw 24 and the tensioner arm slot screw 28 are in their holes, but are not secured, the tensioner arm 20 is free to pivot about the tensioner arm pivot screw 24, to the extent allowed by the slot two 27.

Figure 4:
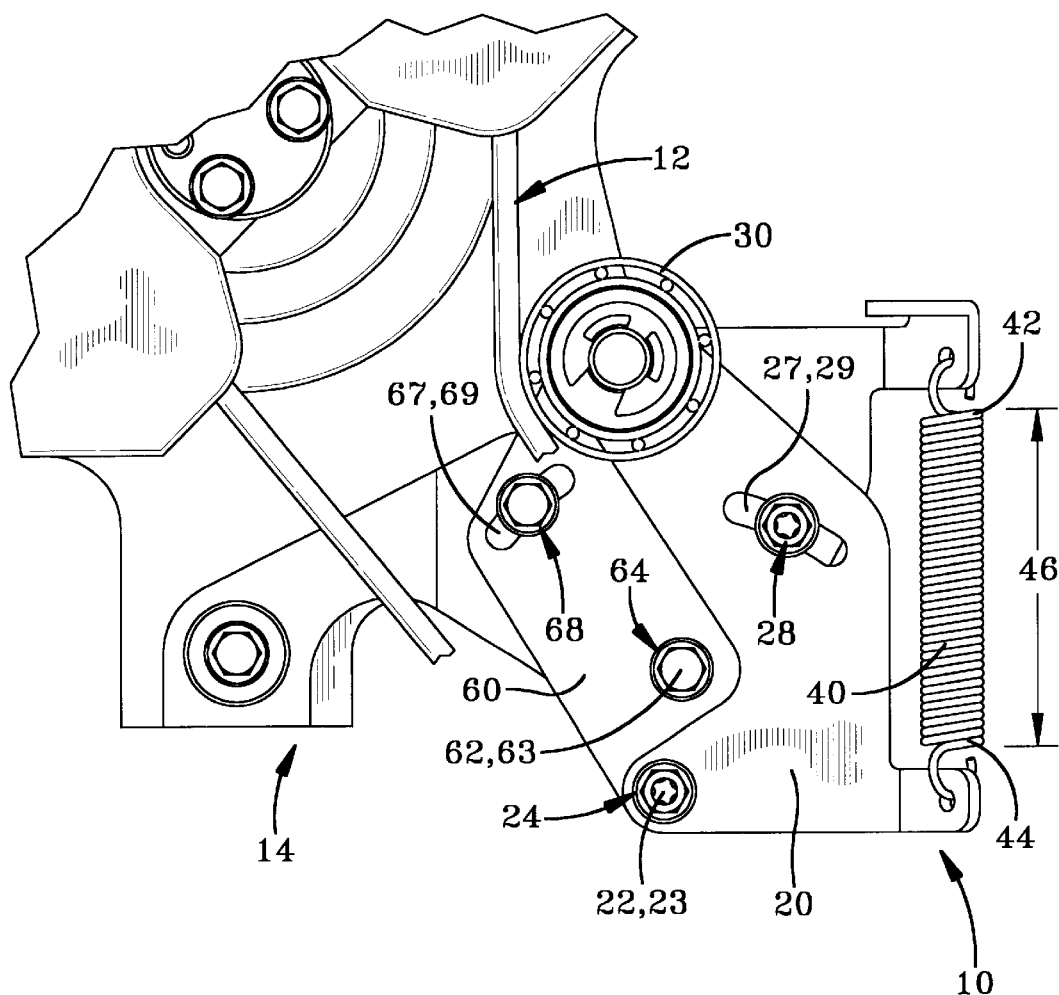
FIG. 4 is a front view of a compensating tensioner assembly, according to a further aspect of the invention.

FIGS. 1 and 4 are variations of the same assembly. Size envelope and other design constraints dictate that the assembly comprises a variety of configurations. FIGS. 1 and 4 are presented as a way to show how different the tensioner assemblies can be configured, while still having the same parts and performing the same function, and are in no way intended to limit the invention to these two configurations.

Referring now to either FIG. 1 or FIG. 4, a further aspect of the invention is a method for tensioning drive belts on machines. This method comprises mounting a base plate 60 to the machine 14 at a base plate mounting point 63 such that the base plate 60 can be rotated about the base plate mounting point 63 when the base plate 60 is not secured against rotation. It further comprises mounting a tensioner arm 20 to the base plate 60 at a tensioner arm mounting point 23 such that the tensioner arm 20 can be rotated about the tensioner arm mounting point 23 when the tensioner arm 20 is not secured against rotation; and mounting a belt tensioning pulley 30 to the tensioner arm 20 such that it is adjacent to the drive belt 12.

This method further comprises attaching a spring 40 with an end one 42 and an end two 44, at end one 42 to the base plate 60, and at end two 44 to the tensioner arm 20, such that when the tensioner arm 20 is not secured against rotation the spring 40 causes the tensioner arm 20 to pivot about the tensioner arm mounting point 23, which in turn causes the belt tensioning pulley 30 to exert a force on the drive belt 12 in a manner which increases the tension on the drive belt 12. The spring 40 has a predetermined working length 46, at which the spring 40 causes a predetermined tension to be applied on the drive belt 12, as previously described herein.

The next step in this method is to rotate the base plate 60 about the base plate mounting point 63, and the tensioner arm 20 about the tensioner arm mounting point 23 until the spring 40 attains the predetermined working length 46. Finally, with the spring 40 at the predetermined length, secure the base plate 60 against rotation; and then secure the tensioner arm 23 against rotation. There is a preferred order for screw tightening to minimize tensioning inaccuracies due to torque-steering of the assembly components during screw tightening. The preferred order is to first tighten the base plate slot screw 68, then the base plate pivot screw 64, then the tensioner arm slot screw 28, and finally the tensioner arm pivot screw 24.

According to another aspect of the invention, the spring predetermined working length 46 is maintained at each drive belt 12 tension adjustment by using an alignment index to align the tensioner arm 20 and the base plate 60 with respect to each other. There are many such alignment indexes which may be used in this method, one such comprises using an alignment hole 52 in the base plate 60, and an alignment slot 54 in the tensioner arm 20, wherein when the spring 40 is at the predetermined working length 46, the alignment hole 52 will be fully visible within the alignment slot 54. This is just one example of the types of alignment indexes which may be used, and is not intended to limit in any way the methods available.

Another aspect of the invention is a method for adjusting the tension of drive belts 12 on machines 14. This method comprises rotating a base plate 60 about a base plate mounting point 63, and rotating a tensioner arm 20 about a tensioner arm mounting point 23, wherein the tensioner arm 20 has a belt tensioning pulley 30 attached thereto. In this method, there is a spring 40 having an end one 42 and an end two 44, wherein the end one 42 is attached to the base plate 60, and end two 44, is attached to the tensioner arm 20, such that when the base plate 60 is rotated to increase the spring force, the spring 40 causes the tensioner arm 20 to pivot about the tensioner arm mounting point 23, which in turn causes the belt tensioning pulley 30 to exert a force on the drive belt 12 in a manner which increases the tension on the drive belt 12, wherein the spring 40 has a predetermined working length 46, at which the spring 40 causes a predetermined tension to be applied on the drive belt 12, as previously described herein.

This method further comprises continuing rotating the base plate 60 about the base plate mounting point 63 until the spring 40 reaches its predetermined length 46, and then securing the base plate 60 and the tensioner arm 20 against rotation.

According to a further aspect of the invention, an alignment index is used to determine when the spring 40 reaches its predetermined length 46. In a particular embodiment, the alignment index 50 comprises an alignment hole 52 in the base plate 60, and an alignment slot 54 in the tensioner arm 20, wherein when the spring 40 is at the predetermined working length 46, the alignment hole 52 will be fully visible within the alignment slot 54.

Figure 5:
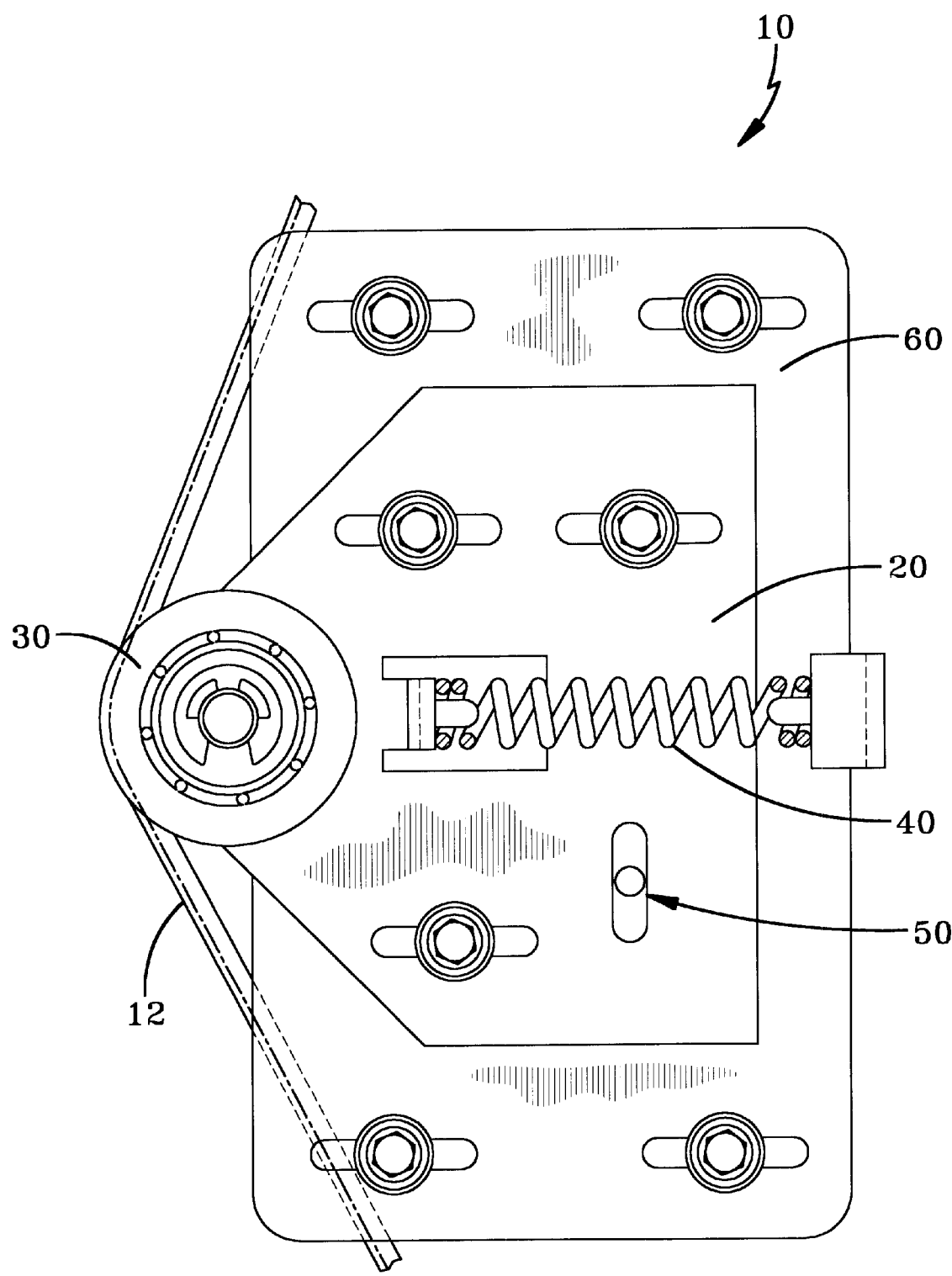
FIG. 5 is a front view of a compensating tensioner assembly, according to a further aspect of the invention.
Figure 6:
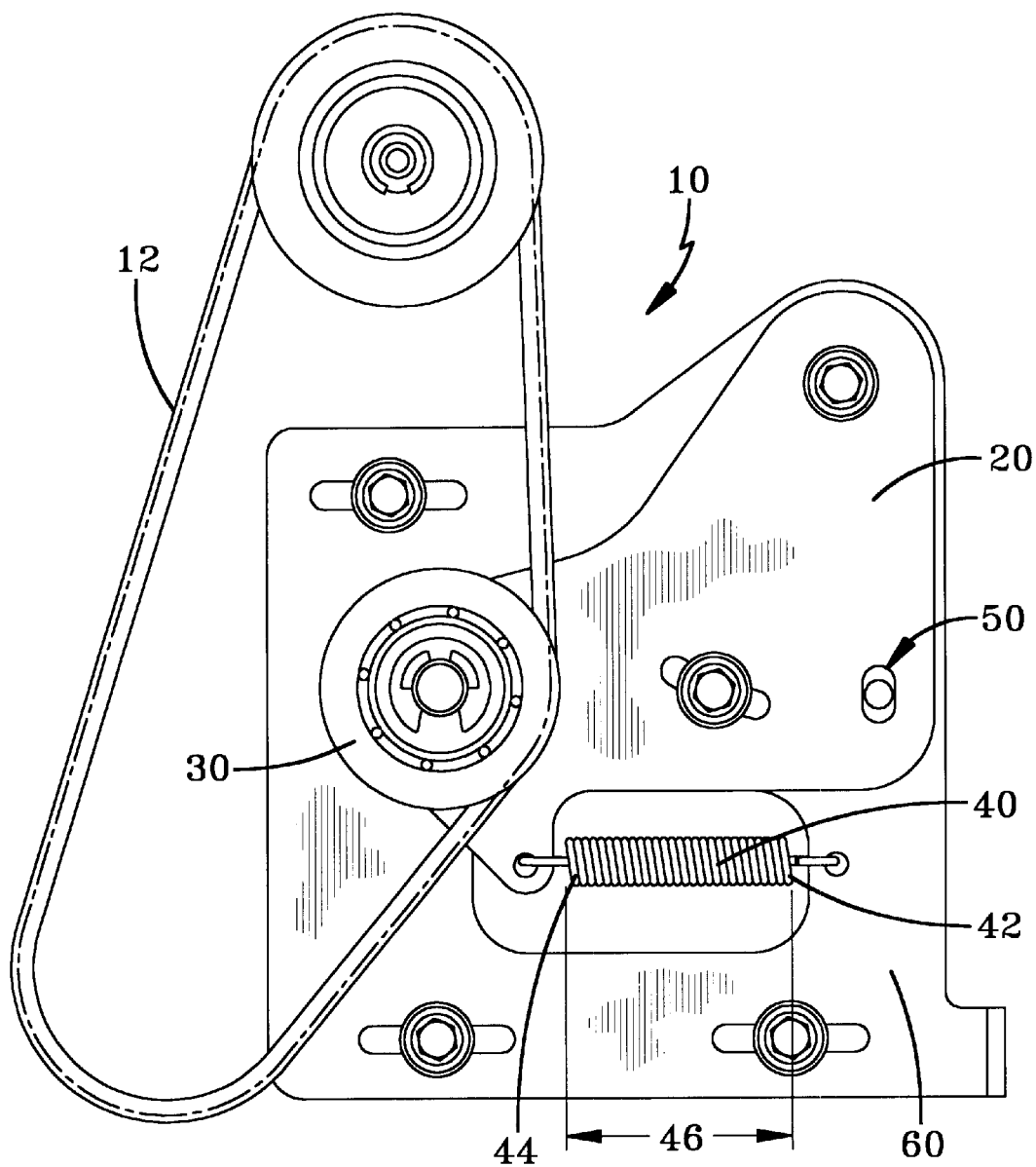
FIG. 6 is a front view of a compensating tensioner assembly, according to a further aspect of the invention.
Figure 7:
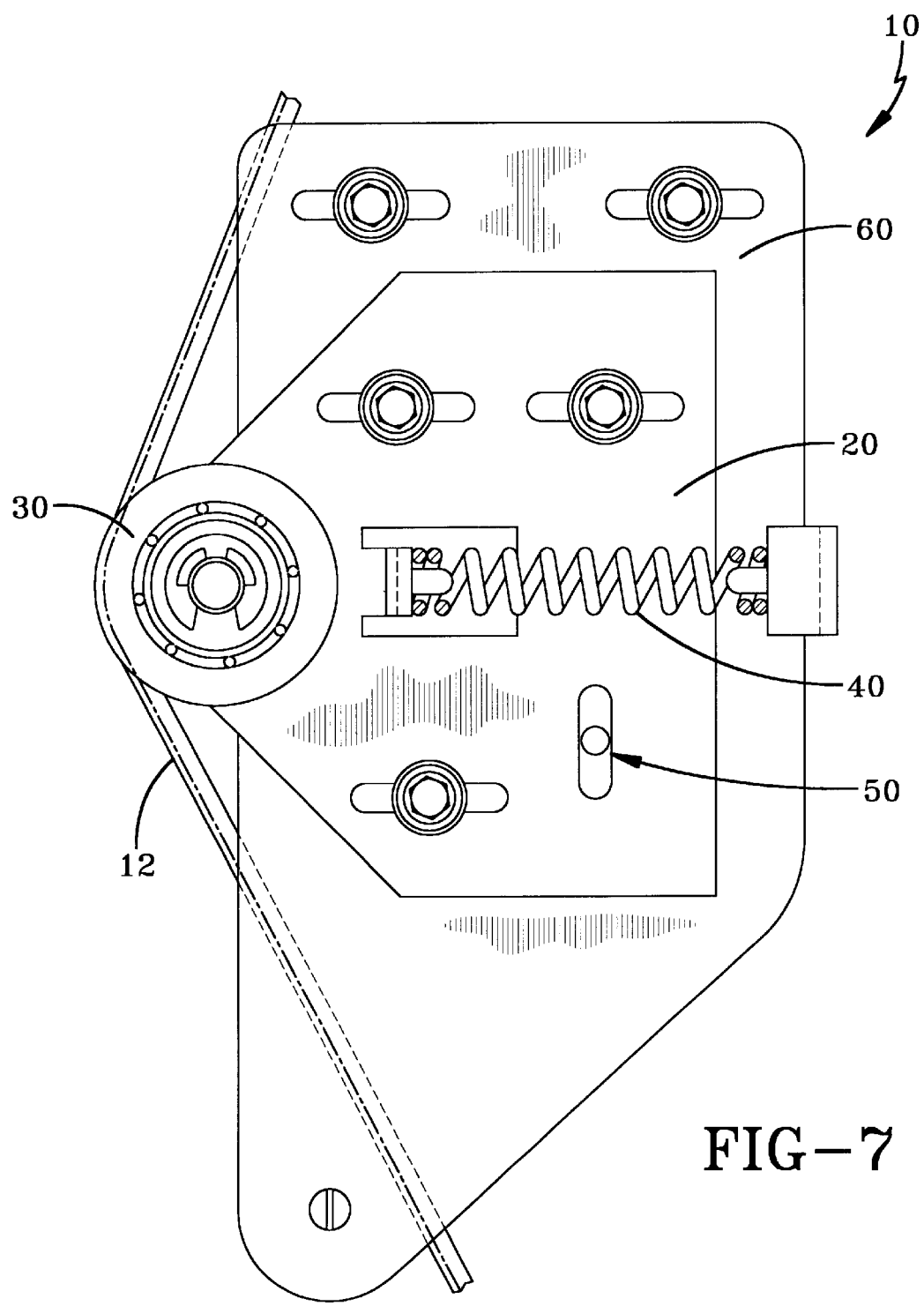
FIG. 7 is a front view of a compensating tensioner assembly, according to a further aspect of the invention.

Referring now to FIGS. 5–7, according to another aspect of the invention, a compensating tensioner assembly 10 for tensioning a drive belt 12 on a machine 14, comprises a base plate 60, a tensioner arm 20, a belt tensioning pulley 30, a spring 40, and an alignment index 50. The tensioner arm 20 is mounted to the base plate 60, and the base plate 60 is mounted to the machine 14, such that the tensioner arm 20 and the base plate 60 are moveable with respect to each other, and with respect to the machine 14 when the tensioner arm 20 and the base plate 60 are not secured against movement. The base plate 60 could be slidably moveable, or rotatably moveable on the machine 14, and is capable of being secured against movement. The tensioner arm 20 could likewise be slidably moveable, or rotatably moveable with respect to the base plate 60, and is capable of being secured against movement. The base plate 60 and the tensioner arm 20 need not be moveable in the same way, in other words, one could be slidably moveable, while the other is rotatably moveable. FIG. 5 shows both the base plate 60 and the tensioner arm 20 being slidably moveable. FIG. 6 shows the base plate 60 being slidably moveable and the tensioner arm 20 being rotatably moveable. FIG. 7 shows the base plate 60 being rotatably moveable, and the tensioner arm 20 being slidebly moveable.

A belt tensioning pulley 30 is mounted to the tensioner arm 20, wherein the belt tensioning pulley 30 is adjacent to the drive belt 12.

This assembly also implements a spring 40 having an end one 42 and an end two 44, wherein end one 42 is attached to the base plate 60, and end two 44 is attached to the tensioner arm 20, such that when the tensioner arm 20 is not secured against movement, the spring 40 causes the tensioner arm 20 to move in a manner which causes the belt tensioning pulley 30 to exert a force on the drive belt 12 which increases the tension on the drive belt 12. The spring 40 has a predetermined working length 46 at which the spring 40 causes a predetermined tension to be applied to the drive belt 12, as previously described herein. An alignment index 50 is used to align the tensioner arm 20 and the base plate 60 with respect to each other such that the spring predetermined working length 46 can be maintained at each adjustment. The spring 40 used could be a compression spring or a tension spring, depending upon the configuration of the base plate 60 and the tensioner arm 20.

Although this invention is useful for any drive belt, it is particularly useful for the timing belt of a digital electro photographic marking engine. The timing belt on these marking engines synchronizes the film drive, the encoder drive and the paper drive, so that the resulting image is properly aligned. This invention decreases the variation in the belt tension not only from adjustment to adjustment, but also from machine to machine during manufacture. Therefore the compensating tensioner assembly increases the performance of these machines.

What is claimed is:

1. A compensating tensioner assembly for tensioning a drive belt on a machine, comprising:

a base plate mounted on the machine at a base plate pivot point, such that said base plate is free to pivot about said base plate pivot point when said base plate is not secured against rotation;

a tensioner arm mounted to said base plate at a tensioner arm pivot point such that said tensioner arm can be rotated about said tensioner arm pivot point when said tensioner arm is not secured against rotation;

a belt tensioning pulley mounted to said tensioner arm such that it is adjacent to the drive belt;

a spring with an end one and an end two, wherein said end one is attached to said base plate, and said end two is attached to said tensioner arm, such that when said tensioner arm is not secured against rotation said spring causes said tensioner arm to pivot about said tensioner arm pivot point, which in turn causes said belt tensioning pulley to exert a force on the drive belt in a manner which increases the tension on the drive belt, said spring having a predetermined working length, at which said spring causes a predetermined tension to be applied on the drive belt;

an alignment index to align said tensioner arm and said base plate with respect to each other such that said spring predetermined working length can be maintained at each drive belt tension adjustment.

2. The compensating tensioner assembly of claim 1 wherein said base plate is mounted to the machine at said base plate pivot point using a base plate pivot screw, wherein said base plate has a base plate pivot hole at said base plate pivot point in which said base plate pivot screw fits.

3. The compensating tensioner assembly of claim 1 wherein said base plate is mounted to the machine at said base plate pivot point using a base plate pivot screw and at a second point by a base plate slot screw, wherein said base plate has a base plate pivot hole at said base plate pivot point in which said base plate pivot screw fits, and said base plate has a hole one which is configured to allow movement, in which said base plate slot screw fits, such that when said base plate is not secured against rotation, said base plate is free to pivot about said base plate pivot screw, to the extent allowed by said hole one.

4. The compensating tensioner assembly of claim 1 wherein said base plate is mounted to the machine at said base plate pivot point using a base plate pivot screw and at a second point by a base plate slot screw, wherein said base plate has a base plate pivot hole at said base plate pivot point in which said base plate pivot screw fits, and said base plate has a slot one, in which said base plate slot screw fits, such that when said base plate is not secured against rotation, said base plate is free to pivot about said base plate pivot screw, to the extent allowed by said slot one.

5. The compensating tensioner assembly of claim 1 wherein said tensioner arm is mounted to the base plate at said tensioner arm pivot point using a tensioner arm pivot screw, wherein said tensioner arm has a tensioner arm pivot hole at said tensioner arm pivot point in which said tensioner arm pivot screw fits.

6. The compensating tensioner assembly of claim 1 wherein said tensioner arm is mounted to said base plate at said tensioner arm pivot point using a tensioner arm pivot screw and at a second point by a tensioner arm slot screw, wherein said tensioner arm has a tensioner arm pivot hole at said tensioner arm pivot point in which said tensioner arm pivot screw fits, and said tensioner arm has a hole two which is configured to allow movement, in which said tensioner arm slot screw fits, such that when said tensioner arm is not secured against rotation, said tensioner arm is free to pivot about said tensioner arm pivot screw, to the extent allowed by said hole two.

7. The compensating tensioner assembly of claim 1 wherein said tensioner arm is mounted to said base plate at said tensioner arm pivot point using a tensioner arm pivot screw and at a second point by a tensioner arm slot screw, wherein said tensioner arm has a tensioner arm pivot hole at said tensioner arm pivot point in which said tensioner arm pivot screw fits, and said tensioner arm has a slot two, in which said tensioner arm slot screw fits, such that when said tensioner arm is not secured against rotation, said tensioner arm is free to pivot about said tensioner arm pivot screw, to the extent allowed by said slot two.

8. The compensating tensioner assembly of claim 1 wherein said alignment index comprises an alignment hole in said base plate, and an alignment slot in said tensioner arm, wherein when said spring is at said predetermined working length, said alignment hole will be fully visible within said alignment slot.

9. The compensating tensioner assembly of claim 1 wherein said alignment index comprises a notch in said tensioner arm and a scribe line in said base plate, such that when said spring is at the predetermined working length, said notch and said scribe line will line up.

10. A method for tensioning drive belts on machines comprising:
mounting a base plate to the machine at a base plate mounting point such that said base plate can be rotated about said base plate mounting point when said base plate is not secured against rotation;
mounting a tensioner arm to said base plate at a tensioner arm mounting point such that said tensioner arm can be rotated about said tensioner arm mounting point when said tensioner arm is not secured against rotation;
mounting a belt tensioning pulley to said tensioner arm such that it is adjacent to the drive belt;
attaching a spring with an end one and an end two, at end one to said base plate, and at end two to said tensioner arm, such that when said tensioner arm is not secured against rotation said spring causes the tensioner arm to pivot about said tensioner arm mounting point, which in turn causes said belt tensioning pulley to exert a force on the drive belt in a manner which increases the tension on the drive belt, said spring having a predetermined working length, at which said spring causes a predetermined tension to be applied on the drive belt;
rotating said base plate about said base plate mounting point, and said tensioner arm about said tensioner arm mounting point until said spring attains said predetermined working length;
securing said base plate against rotation; and,
securing said tensioner arm against rotation;
wherein said spring predetermined working length is maintained at each drive belt tension adjustment by using an alignment index to align said tensioner arm and said base plate with respect to each other.

11. The method of claim 10 wherein said base plate is mounted to the machine at said base plate mounting point using a base plate pivot screw, wherein said base plate has a base plate pivot hole at said base plate mounting point in which said base plate pivot screw fits.

12. The method of claim 10 wherein said base plate is mounted to the machine at said base plate mounting point using a base plate pivot screw and at a second point by a base plate slot screw, wherein said base plate has a base plate pivot hole at said base plate mounting point in which said base plate pivot screw fits, and said base plate has a hole two which is configured to allow movement, in which said base plate slot screw fits, such that when said base plate is not secured against rotation, said base plate is free to pivot about said base plate pivot screw, to the extent allowed by said hole two.

13. The method of claim 10 wherein said base plate is mounted to the machine at said base plate mounting point using a base plate pivot screw and at a second point by a base plate slot screw, wherein said base plate has a base plate pivot hole at said base plate mounting point in which said base plate pivot screw fits, and said base plate has a slot one, in which said base plate slot screw fits, such that when said base plate is not secured against rotation, said base plate is free to pivot about said base plate pivot screw, to the extent allowed by said slot one.

14. The method of claim 10 wherein said tensioner arm is mounted to the base plate at said tensioner arm mounting point using a tensioner arm pivot screw, wherein said tensioner arm has a tensioner arm pivot hole at said tensioner arm mounting point in which said tensioner arm pivot screw fits.

15. The method of claim 10 wherein said tensioner arm is mounted to the base plate at said tensioner arm mounting point using a tensioner arm pivot screw and at a second point by a tensioner arm slot screw, wherein said tensioner arm has a tensioner arm pivot hole at said tensioner arm mounting point in which said tensioner arm pivot screw fits, and said tensioner arm has a hole two which is configured to allow movement, in which said tensioner arm slot screw fits, such that when said tensioner arm is not secured against rotation, said tensioner arm is free to pivot about said tensioner arm pivot screw, to the extent allowed by said hole two.

16. The method of claim 10 wherein said tensioner arm is mounted to the base plate at said tensioner arm mounting point using a tensioner arm pivot screw and at a second point by a tensioner arm slot screw, wherein said tensioner arm has a tensioner arm pivot hole at said tensioner arm mounting point in which said tensioner arm pivot screw fits, and said tensioner arm has a slot two, in which said tensioner arm slot screw fits, such that when said tensioner arm is not secured against rotation, said tensioner arm is free to pivot about said tensioner arm pivot screw, to the extent allowed by said slot two.

17. The method of claim 10 wherein said alignment index comprises an alignment hole in said base plate, and an alignment slot in said tensioner arm, wherein when said spring is at the predetermined working length, said alignment hole will be fully visible within said alignment slot.

18. A method for adjusting the tension of drive belts on machines, comprising:

rotating a base plate about a base plate mounting point;

rotating a tensioner arm about a tensioner arm mounting point, said tensioner arm having a belt tensioning pulley attached thereto, a spring having an end one and an end two, wherein said end one is attached to said base plate and said end two is attached to said tensioner arm, such that when said base plate is rotated to increase said spring force, said spring causes the tensioner arm to pivot about said tensioner arm pivot point, which in turn causes said belt tensioning pulley to exert a force on the drive belt in a manner which increases the tension on the drive belt, said spring having a predetermined working length, at which said spring causes a predetermined tension to be applied on the drive belt;

continue rotating said base plate about said base plate mounting point until said spring reaches its predetermined length;

securing said base plate against rotation; and, securing said tensioner arm against rotation;

wherein an alignment index is used to determine when said spring reaches its predetermined length.

19. The method of claim 18 wherein said alignment index comprises an alignment hole in said base plate, and an alignment slot in said tensioner arm, wherein when said spring is at said predetermined working length, said alignment hole will be fully visible within said alignment slot.

20. A compensating tensioner assembly for tensioning a drive belt on a machine, comprising:

a base plate;

a tensioner arm, wherein said tensioner arm is stacked on said base plate, and mounted to said base plate, and said base plate is mounted to said machine, such that said tensioner arm and said base plate are moveable with respect to each other, and with respect to said machine when said tensioner arm and said base plate are not secured against movement;

a belt tensioning pulley mounted to said tensioner arm, wherein said belt tensioning pulley is adjacent to the drive belt;

a spring having an end one and an end two, wherein said end one is attached to said base plate, and said end two is attached to said tensioner arm, such that when said tensioner arm is not secured against movement, said spring causes said tensioner arm to move in a manner which causes the belt tensioning pulley to exert a force on the drive belt which increases the tension on the drive belt, said spring having a predetermined working length at which said spring causes predetermined tension to be applied to the drive belt;

an alignment index to align said tensioner arm and said base plate with respect to each other such that said spring predetermined working length can be maintained at each adjustment.

\* \* \* \* \*